United States Patent [19]

Ehrlinger et al.

[11] Patent Number: 4,667,536
[45] Date of Patent: * May 26, 1987

[54] HYDROSTATIC/MECHANICAL TRANSMISSION SYSTEM

[75] Inventors: Friedrich Ehrlinger; Egon Mann, both of Friedrichshafen, Fed. Rep. of Germany

[73] Assignee: Zahnradfabrik Friedrichshafen AG, Friedrichshafen, Fed. Rep. of Germany

[*] Notice: The portion of the term of this patent subsequent to Apr. 15, 2003 has been disclaimed.

[21] Appl. No.: 649,129

[22] Filed: Sep. 10, 1984

[30] Foreign Application Priority Data

Sep. 15, 1983 [WO] PCT Int'l Appl. .................. PCT/EP83/00244

[51] Int. Cl.4 .............................................. F16H 47/00
[52] U.S. Cl. ........................................ 74/720; 74/15.4; 180/53.2
[58] Field of Search ...................... 74/718, 720, 665 P, 74/665 A, 745, 687, 15.4, 15.6, 15.66, 15.86, 15.8; 180/53.1, 53.2, 53.4, 53.7, 53.8

[56] References Cited

U.S. PATENT DOCUMENTS

| 3,747,349 | 7/1973 | Weiss | 74/720 X |
| 3,868,869 | 3/1975 | Hunt et al. | 74/867 |
| 3,903,756 | 9/1975 | Hamma | 74/720 X |
| 3,916,711 | 11/1975 | Hoyer | 74/745 X |
| 3,922,931 | 12/1975 | Osujyo et al. | 74/745 |
| 4,023,418 | 5/1977 | Zenker | 74/745 X |
| 4,056,989 | 11/1977 | Shaffer | 74/745 |
| 4,271,723 | 6/1981 | Shaffer | 180/53.2 |
| 4,273,007 | 6/1981 | Sato et al. | 74/745 |
| 4,581,949 | 4/1986 | Mann et al. | 180/53.2 X |

FOREIGN PATENT DOCUMENTS

| 543319 | 7/1957 | Canada | 180/53.2 |
| 2808437 | 8/1979 | Fed. Rep. of Germany . | |
| 1278223 | 6/1972 | United Kingdom . | |

Primary Examiner—Allan D. Herrmann
Assistant Examiner—David Novais
Attorney, Agent, or Firm—Hayes, Davis & Soloway

[57] ABSTRACT

A hydrostatic/mechanical transmission system for motor vehicles having an engine coupled with a multi-speed mechanical transmission and a hydrostatic transmission including an accessory drive connectable to activate a variable displacement hydropump that is hydraulically connected with hydromotor; wherein, in one mode of operation, the hydrostatic transmission is operated, with the mechanical transmission in neutral, and the hydromotor drives the vehicle by way of a stepdown gear, wherein the stepdown gear drive is a multistep power transmission and wherein when in the one mode, the hydromotor drives a secondary gear shaft of the multi-speed transmission, the connection of this one mode being possible only in the neutral position of the multi-speed transmission.

1 Claim, 1 Drawing Figure

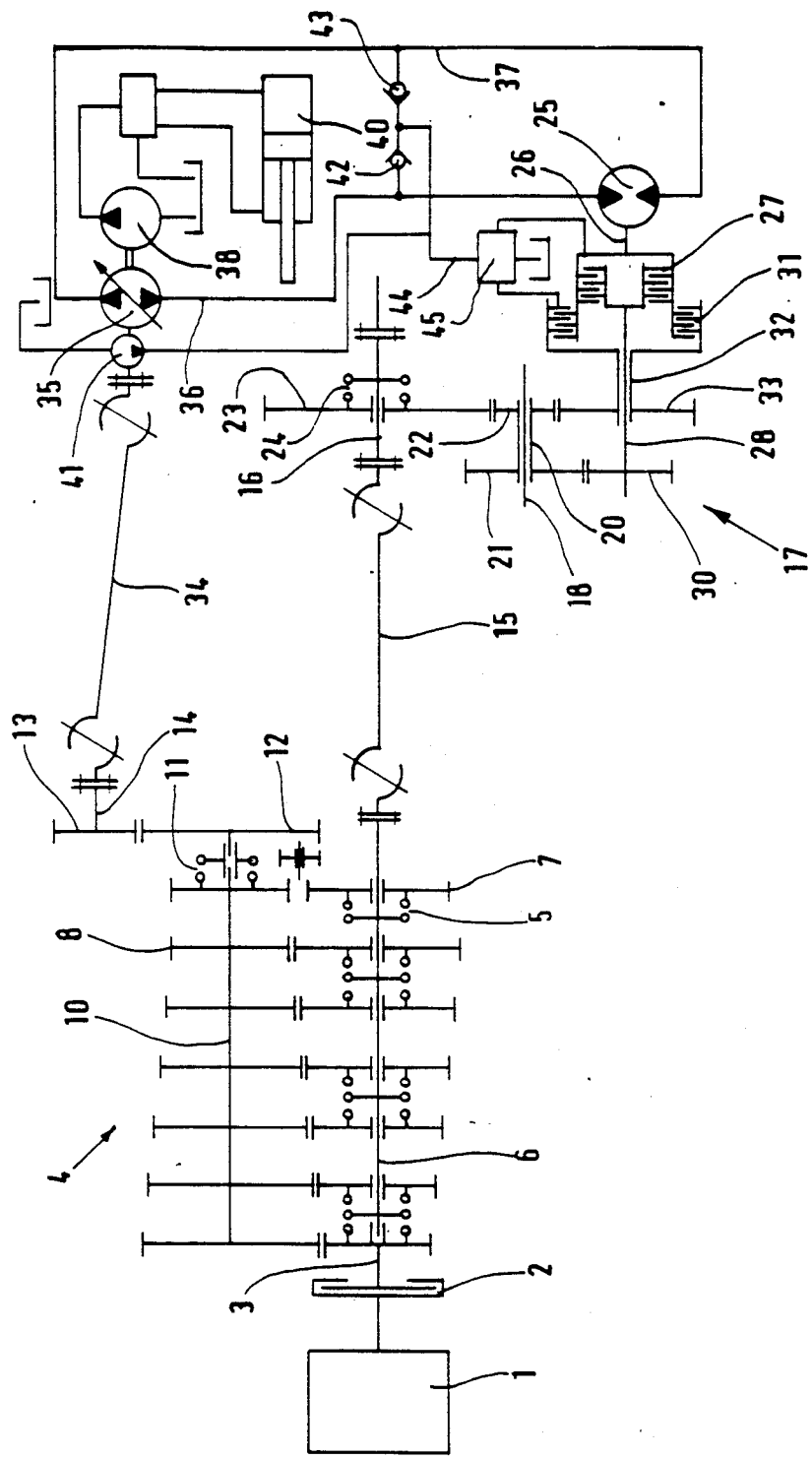

HYDROSTATIC/MECHANICAL TRANSMISSION SYSTEM

The invention concerns itself with a hydrostatic/mechanical transmission system for commercial motor vehicles.

In commercial motor vehicles used as goods or passenger carriers, the transmission must meet the two following requirements:

creep speed travel, as when used with the additional units, especially in "stop-and-go operation", wherein the continuous hydrostatic transmission is engaged;

normal travel over substantial distances with the usual multispeed variable gear.

DE-OS No. 28 08 437, for instance, has disclosed such a transmission system that shows, coupled with the engine, a variable gear which actuates one or more driving axles across a distributor gear. In addition, there is connected to the engine a switchable accessory drive which can drive several hydromotors across a pump distributor gear. One of these pumps is hydraulically in communication with one hydromotor, which drives the variable gear across the stepdown gear. In this transmission, by making allowances for a higher switching action, the variable gear can be used for hydrostatic creep speed travel. In this mode, the vehicle must be stopped to make each gear shift. Such a system makes necessary, in addition to the main clutch, another clutch, which, when the hydrostatic drive is engaged, makes possible a division of the main drive between the engine and the variable gear.

British Pat. No. 12 78 223 discloses a transmission system including an engine coupled through a shifting clutch; an accessory motor-dependent power take-off driving a variable displacement pump, which is hydraulically connected with a hydromotor for creep speed operation; said variable displacement pump acting upon said hydromotor in a closed circuit; and an accessory hydraulic power system for driving working units. An engine is here connected by an intermediate gearbox with a multispeed transmission that drives a driving axle. A motor-dependent variable displacement pump drives through a hydraulic circuit a hydromotor, which can be connected to the traveling gear via the intermediate gearbox. In this arrangement, together with the normal drive, a hydrostatic creep speed drive is only possible via the normal travel transmission using the speed steps of the multispeed transmission. The multispeed transmission has, in addition, a power take-off shaft for driving a constant displacement pump connected to a hydromotor for the accessory hydraulic power system.

The present invention is intended to provide for such vehicles a continuously regulatable additional drive, which makes available a maximum energy on the accessory drive for a working unit with simultaneous high torque on the vehicle driving mechanism. The intent is to accomplish this in a simple reliable construction having simple operating requirements.

According to the invention, there is provided a hydrostatic/mechanical transmission system for motor vehicles haing an engine coupled with a multi-speed mechanical transmission and a hydrostatic transmission including an accessory drive connectable to actuate a variable displacement hydropump that is hydraulically connected with a hydromotor; wherein, in one mode of operation, the hydrostatic transmission is operated, with the mechanical transmission in neutral, and said hydromotor drives the vehicle by way of a stepdown gear, wherein said stepdown gear drive is a multistep power transmission and wherein when in said one mode, said hydromotor drives a secondary gear shaft of said multispeed transmission, the connection of this one mode being possible only in the neutral position of said multispeed transmission.

The invention provides as an additional drive, an intermediate gearbox having a multi-speed automatically charged power transmission. This has the advantage that small hydrocomponents can be used. Because of the fact that the hydromotor is a variable displacement pump, by regulating it, a very good efficiency can be offered for the vehicle driving mechanism and the accessory drive. It is advantageous here to regulate the variable displacement pump by a speed- and load-dependent control. The additional drive acts upon an output shaft of an intermediate gearbox permanently connected to the secondary gear shaft so that additional driving elements are eliminated. The change to a hydrostatic creep speed drive takes place in the neutral position of the variable gear so that the secondary gear shaft can freely rotate. At the same time a mechanical, hydraulic, or electrical locking means ensures that the intermediate gearbox can be switched in only the neutral position of the variable gear.

The invention will now be described, by way of example, with reference to the accompanying drawing, which diagrammatically illustrates a hydrostatic/mechanical transmission, according to the invention.

In the description with reference to the drawings, the following reference numerals identify components as follows:

| | |
|---|---|
| 1. Engine | 27. Friction clutch |
| 2. Main clutch | 28. Shaft |
| 3. Primary gear shaft | 30. Gear |
| 4. Multi-speed transmission | 31. Friction clutch |
| 5. Shifting clutch | 32. Hollow shaft |
| 6. Secondary gear shaft | 33. Gear |
| 7. Idler gear | 34. Drive shaft |
| 8. Fixed gear | 35. Variable displacement pump |
| 10. Countershaft | 36. Pipe |
| 11. Clutch | 37. Pipe |
| 12. Gear | 38. Pump with constant delivery |
| 13. Gear | 40. Working cylinder |
| 14. P.T.O. shaft | 41. Charge pump |
| 15. Drive shaft | 42. Check valve |
| 16. Output shaft | 43. Check valve |
| 17. Intermediate gearbox | 44. Pipe |
| 18. Intermediate shaft | 45. Control valve |
| 20. Hollow shaft | |
| 21. Gear | |
| 22. Gear | |
| 23. Idler gear | |
| 24. Clutch | |
| 25. Hydromotor | |
| 26. Primary shaft | |

An engine 1 drives by way of a main clutch 2 and a primary gear shaft 3, a six ratio gear mechanism 4 of a conventional constant mesh transmission gear construction. All the shifting clutches (such as 5) are keyed to but longitudinally movable on a secondary gear shaft 6 and can couple the idler gears (such as 7) with the output shaft 6. The idler gears are meshed with fixed gears (such as 8) on a countershaft 10. The mode of operation of such a gear mechanism is generally known. The countershaft 10 is connected through a pair of meshing gears 12, 13 and a clutch 11 with a power take off (P.T.O.) shaft 14.

The secondary gear shaft 6 is connected by a drive shaft 15 to an output shaft 16 of an intermediate gearbox 17. The output shaft 16 leads to an axle drive not shown. The intermediate gearbox 17 includes in addition an intermediate shaft 18 that carries a hollow shaft 20 to which two gears 21, 22 are secured. The gear 22 meshes with an idler gear 23 upon the output shaft 16. The idler gear 23 can be coupled by a clutch 24 with the output shaft 16. A primary shaft 26 is connected to be driven by a hydromotor 25 which is arranged to be coupled by a friction clutch 27 with a shaft 28 upon which is fastened a gear 30 that meshes with the gear 21. In addition, the primary shaft 26 is arranged to be coupled by another friction clutch 31 with a gear 33 fastened upon a hollow shaft 32, through which shaft 28 extends axially. This gear 33 meshes with the gear 22. Thus, one gear ratio can be achieved by engagement of the friction clutch 27 and another ratio can be achieved by engagement of the friction clutch 31.

The P.T.O. shaft 14 is connected to drive by way of a drive shaft 34, a variable displacement pump 35 that in turn hydraulically drives, by way of hydraulic lines 36, 37, the hydromotor 25 which is attached to drive the primary shaft 26 of intermediate gearbox 17. Via the P.T.O. shaft 14 it is possible to drive, simultaneously with the variable displacement pump 35, a pump with constant displacement 38 that supplies oil under pressure to the working cylinders 40 of, for example, snow-removal equipment. The variable displacement pump 35 and the pump of constant displacement 38 are here advantageously designed as tandem pumps. It is easily possible also by means of the pump of constant displacement 38 to drive, instead of the working cylinder 40, a hydromotor such as one for a snow propeller.

It is also possible to drive the hydromotor 25 in a closed loop circuit by means of the variable displacement pump 35. In this case there is present for balancing waste oil losses a charge pump 41 that feeds oil under pressure in the lines 36, 37 via check valves 42 and 43. It is of advantage here to use the charge pump 41 also for supplying oil under pressure to operate the friction clutches 27 and 31. For this purpose a communication to the charge pump 41 is made by way of line 44 and an automatically actuatable control valve 45.

When operating in a normal travel mode (mechanical) using the multi ratio transmission 4, the P.T.O. shaft 14 is disconnected by the clutch 11. The clutch 24 of the intermediate gearbox 17 is likewise disengaged. Thus, the secondary gear shaft 6 directly actuates the axle drive across the output shaft 16 of intermediate gearbox 17. The P.T.O. shaft 14 in this mode is not driven and creep speed drive is inoperative.

When operating in a stop-and-go (low or creep speed) mode (hydrostatic) of operation, the engagement of the clutch 24 of the intermediate gearbox 17 to engage the creep speed drive can be effected, only when permitted, by a suitable clutch lock-out means, only in the neutral position of multi-ratio transmission and only when the vehicle is stationary. The engagement of the clutch 11 is arranged to occur simultaneously so that the variable displacement pump 35 drives the hydromotor 25 and the latter in turn drives with one transmission ratio; by way of the gears 30, 21, 22, 23, when the friction clutch 27 is engaged, the output shaft 16 and therewith the axle drive. When, on the other hand, the friction clutch 31 is engaged, the drive takes place, at another transmission ratio, by way of the hollow shaft 32, the gears 33, 22, 23 on the output shaft 16, the axle drive. The secondary gear shaft 6 runs free. The two ratios of the intermediate gearbox 17 are engageable under load by the aforementioned automatic operation.

Since the normal travel and the creep speed drive modes are independently operable with only one under load and operating at any one time, substantially no efficiency losses occur either in the hydrostatic or in the mechanical mode of operation.

Regulation of the variable displacement pump 35 allows on the one hand a smooth continuous travel even in pathless regions. The automatic control of the intermediate gearbox 17, on the other hand, ensures a steady change of gear associated with a considerable reduction of clutch work for the driver.

The use of the intermediate gearbox 17 according to the invention increases by almost 20% of the climbing power of the vehicle and the continuous normal operating speed increases to about 45 km/h. In this manner there is provided a driving system of versatile utilization with which the requirements mentioned at the beginning can be optimally met with the simplest manipulation. In addition, the driving system according to the invention offers, with the variable displacement pump 35 driven in conformity with the engine, the advantage that with low consumption of energy of the travel mechanism when used in creep speed (travel with high gear ratio and high traction) a high residual energy is available in the pump with constant delivery 38 and thus also in the accessory hydraulic power system.

We claim:

1. A hydrostatic/mechanical transmission system for motor vehicles having an engine coupled with a multi-speed mechanical transmission, a secondary gear shaft connected to said mechanical transmission, a hydrostatic transmission including an accessory drive connectable to activate a variable displacement hydropump that is hydraulically connected with a hydromotor, and said hydromotor drives the vehicle by way of a intermediate gearbox connected to said secondary gear shaft, characterized in that said intermediate gearbox is a multistep power transmission connectable under load and when in creep drive, said hydromotor drives the secondary gear shaft of said multi-speed transmission, the connection of said creep drive being possible only in the neutral position of said multi-speed transmission, circuit interruption of said intermediate gearbox occurs automatically depending upon speed and load of the engine, and a filling pump, which supplies oil to said hydrostatic drive, also supplies oil to friction clutches which connect said hydrostatic drive to said intermediate gearbox.

* * * * *